United States Patent [19]

Stewart, Sr.

[11] Patent Number: 4,774,754
[45] Date of Patent: Oct. 4, 1988

[54] DISPLACEABLE BRUSH HOLDER FOR DYNAMOELECTRIC MACHINE ASSEMBLY

[75] Inventor: Kenneth W. Stewart, Sr., Columbus, Miss.

[73] Assignee: United Technologies Electro Systems, Inc., Columbus, Miss.

[21] Appl. No.: 62,990

[22] Filed: Jun. 17, 1987

Related U.S. Application Data

[62] Division of Ser. No. 837,108, Mar. 7, 1986, Pat. No. 4,694,214.

[51] Int. Cl.⁴ .................... H02K 15/14; H02K 5/14
[52] U.S. Cl. ......................................... 29/596; 29/597
[58] Field of Search ............... 310/239, 240; 29/596, 29/597

[56] References Cited

U.S. PATENT DOCUMENTS

| | | | |
|---|---|---|---|
| 3,716,735 | 2/1973 | Dippold | 310/240 |
| 4,293,789 | 10/1981 | King | 310/239 |
| 4,423,549 | 1/1984 | King | 29/596 X |
| 4,498,230 | 2/1985 | Harris et al. | 310/242 X |
| 4,561,174 | 12/1985 | Gibli | 29/597 |
| 4,596,941 | 6/1986 | Kluck | 310/239 |
| 4,613,781 | 9/1986 | Sanders | 310/239 |
| 4,694,214 | 9/1987 | Stewart, Sr. | 310/239 |

Primary Examiner—Howard N. Goldberg
Assistant Examiner—T. Ross

[57] ABSTRACT

A dynamoelectric machine including a brush holder having a displaceable section for positioning the brushes in a mounting position is disclosed. The displaceable section is located to secure the brushes in a mounting position and said displaceable section being separated during assembly to allow the brushes to be displaced inwardly to engage the commutator in the final assembled position. Several embodiments of displaceable sections are disclosed.

4 Claims, 3 Drawing Sheets

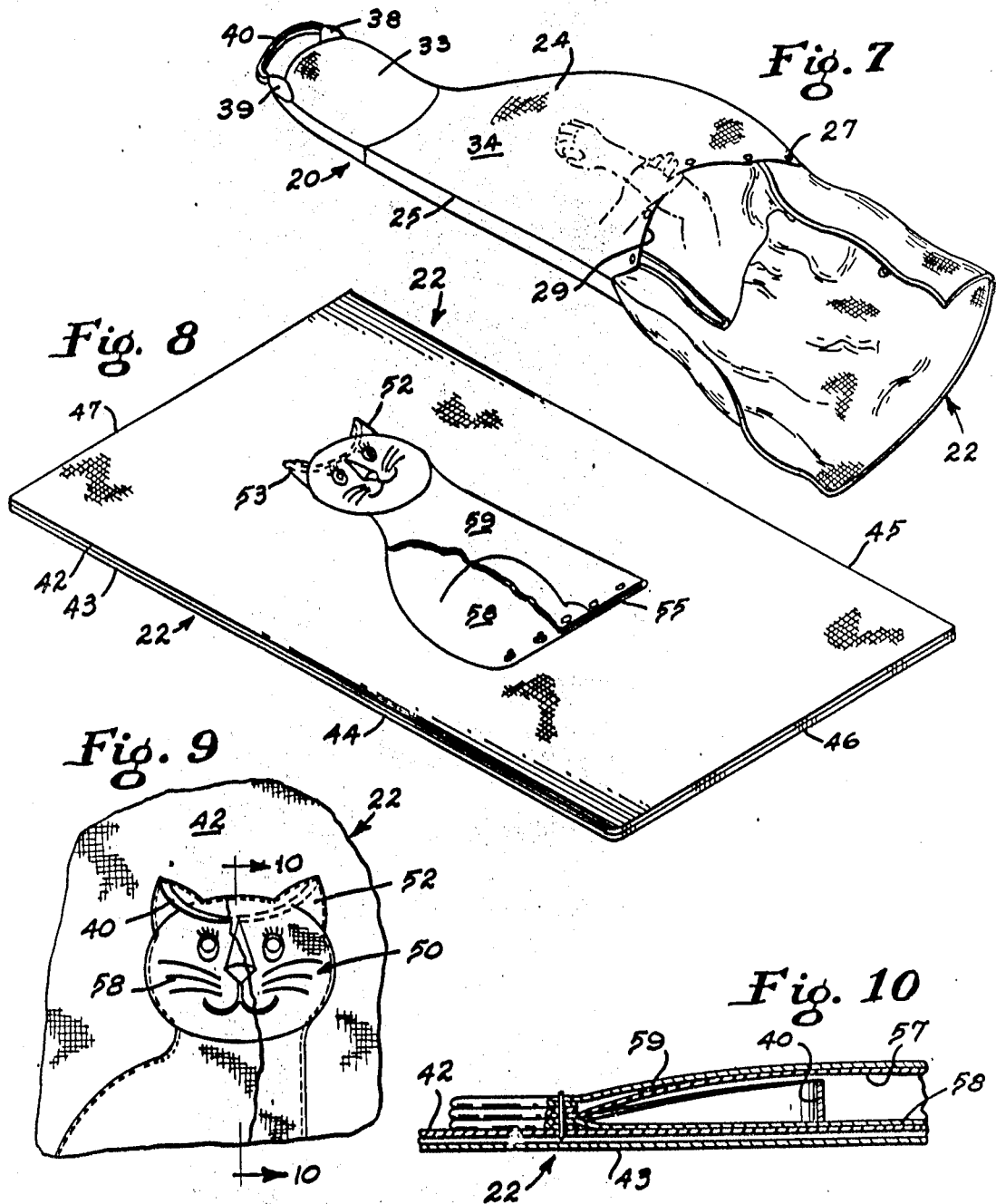

DISPLACEABLE BRUSH HOLDER FOR DYNAMOELECTRIC MACHINE ASSEMBLY

This is a division of application Ser. No. 837,108 filed on Mar. 7, 1986, now U.S. Pat. No. 4,694,214.

FIELD OF THE INVENTION

This invention relates to dynamoelectric machines and a brush holder for securing brushes in the machines during assembly and thereafter. More particularly the present invention applies to motors and generators utilizing brushes wherein it is desirable to have a brush holder to secure the brushes in a position which facilitates assembly and which facilitates automated assembly.

BACKGROUND OF THE INVENTION

The brush riggings for motors and generators and the like vary in design, but in general consist of boxes to house the brushes, a spring means to apply pressure to the brushes to urge them against a commutator, connecting electrical leads to provide a current path to the brushes and a mounting surface to secure these elements as well as to provide some means to secure the entire assembly to the motor in such a manner as to place the brushes in a proper working relationship with the commutator.

One of the most popular designs, especially for small fractional horsepower motors, is to utilize a molded brush card member of a one-piece construction formed from a high temperature resistant plastic. The member has the brush boxes formed thereon as well as various openings for securing it to the motor housing and for receiving an extending armature shaft and the commutator secured to the shaft.

The prior riggings present problems when they are contemplated for use in an automated assembly process. In particular, while assembling the armature in a motor, complicated movements would have to be performed by the automation equipment to hold the brushes back in the brush box against the pressure being applied to the brushes by the spring means until such time as the commutator is positioned to receive the brushes.

Although this is particularly a problem for automated assembly of motors, it also applies to those units being assembled by hand in that special tools and fixtures have previously been used to hold the brushes while the armature is being assembled. The brush holder as described herein would avoid the need for this equipment.

The herein-described brush holder is a molded brush card member having a displaceable section which acts to secure the brushes within the brush box until such time as the armature is assembled thereto. The displaceable section is designed such that upon assembly, the armature to the motor acts to displace the displaceable section thereby releasing the brushes and allowing the brush springs to urge the brushes against the commutator.

Several embodiments are disclosed herein with the displaceable section being designed for varying purposes in each. In one embodiment the displaceable section is a washer-like member which serves as a thrust washer and/or an oil slinger on the armature shaft after it is displaced to release the brushes.

Another embodiment discloses breakaway sections which merely fall to the bottom of the motor housing after they are displaced. A third embodiment discloses fingers which are bent relative to the brush card holder as the armature is assembled.

SUMMARY OF THE INVENTION

An object of the present invention is to provide a unitary brush card holder for securing the brushes in a mounting position prior to assembly.

Another object of the present invention is to provide an improved automated assembly method wherein a brush card holder secures brushes in a monitoring position allowing for automatic assembly of the armature thereto.

A still further object of the present invention is to provide a brush card member wherein a portion of the member is displaced during assembly, said portion thereby releasing the brushes to engage the commutator of the motor.

A yet further object of the present invention is to provide a dynamoelectric machine wherein a brush card member is formed to aid in the assembly of the motor.

A still further object of the present invention is to provide a dynamoelectric machine wherein a displaced section of a brush card member serves as a thrust washer and/or oil slinger on the armature shaft.

Another object of the present invention is to provide a safe, economical, easy to assemble and reliable dynamoelectric machine and method of assembly.

The above objects are achieved according to the invention by the provision of a dynamoelectric machine of the type having brushes that contact a commutator position on an armature shaft of an armature. A brush holder is provided for positioning the brushes to engage the commutator, said brush holder being formed to provide a displaceable section for securing the brushes in a mounting position, said displaceable section being configured such that upon assembly of the motor, the armature shaft is inserted through the brush holder and a portion of the armature engages the displaceable section thereby displacing the section and releasing the brushes to engage a portion of the commutator of the armature.

Also disclosed is a brush holder member for a dynamoelectric machine having an armature including an armature shaft formed to receive at least one cavity for receiving and positioning a brush with respect to a commutator. The brush holder includes a washer portion having a center opening formed from a portion of the holder, the outer circumference of which extends over a portion of the cavity to prevent movement of the brush toward a center position and said washer portion being secured to the remainder of the brush holder portion by breakaway tabs. Upon insertion of the armature shaft and the armature, the tabs separating the washer from the holder break away and the washer is then displaced to serve as a thrust surface for the armature and the brush is released to engage the commutator.

Additionally, disclosed is a method of assembly of a dynamoelectric machine of the type having a housing and brushes that engage a commutator located on an armature having an armature shaft. The method includes the steps of securing a brush holder having at least one brush mounted for reciprocating movement to the housing, said brush holder including a brush spring for urging the brush in a first direction and a displaceable section extending to engage the brush to prevent further movement in the first direction. The armature is then inserted into the housing and as the armature is displaced, the armature engages the displaceable section of the brush holder to displace it to the final assembled position, said armature displacing the displaceable section thereby allowing the brush spring to urge the brush downwardly against the commutator of the armature.

BRIEF DESCRIPTION OF THE DRAWINGS

FIG. 3 is a sectional view of a dynamoelectric machine showing the position of various components therein including a brush card in accordance with another embodiment of the invention.

FIG. 4 is a perspective view of the brush card as shown in FIG. 3 prior to assembly into the motor.

DESCRIPTION OF THE PREFERRED EMBODIMENT

The invention will be described herein relative to small fractional horsepower motors which are designed to facilitate assembly. It is to be understood that this invention has like applicability to other types of dynamoelectric devices which utilize brushes and to various-sized devices and to motors which are manually assembled.

Figure 1:
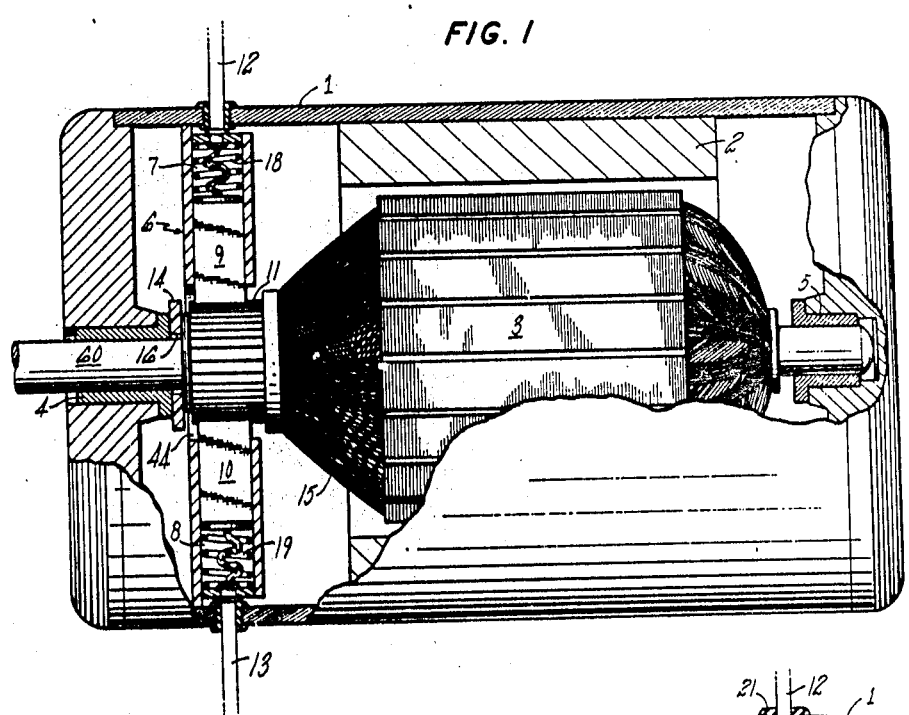
FIG. 1 is a sectional view of a dynamoelectric machine showing the position of various components therein including a brush card in accordance with one embodiment of the invention.

Referring to FIG. 1, there is shown a dynamoelectric machine which is a motor having a housing 1 with permanent magnets 2 secured therein. Armature 3 is supported to rotate within the housing by bearings 4 and 5. A brush card 6 defines brush card boxes having cavities 7 and 8 which hold and position brushes 9 and 10. The brushes are held in the cavities for reciprocating motion. Brush springs 18 and 19 are positioned to urge the brushes 7 and 8 inwardly against commutator 11 of the armature after the motor is assembled. In this position, current is supplied from conductors 12 and 13 through the brushes to the commutator to windings 15 of the armature.

Washer 14 is shown positioned on the armature on shaft 60 between the commutator and bearing 4 and serves as a thrust washer during motor operation. The washer further serves to control end play of the armature by eliminating axial slack between the armature and the housing. Prior to assembly, washer 14 was an integral portion of the brush card as may be seen in FIG. 2.

Figure 2:
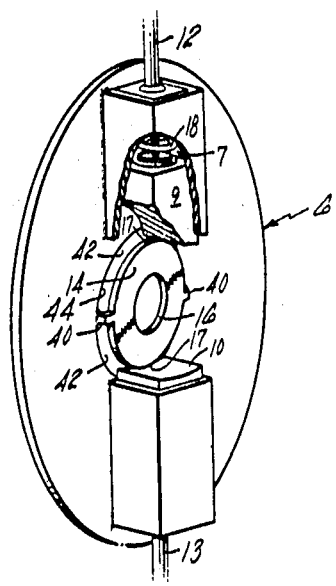
FIG. 2 is a perspective view of the brush card as shown in FIG. 1 prior to assembly into the motor.

Referring now to FIG. 2, there may be seen brush card 6 which in a cutaway portion shows brush box cavity 7 in which brush 9 is mounted for reciprocating motion. Brush spring 18 is shown for urging brush 9 inwardly. Conductors 12 and 13 are shown connected to the appropriate brush.

At the center of brush card 6 there may be seen washer 14. Washer 14 is cylindrical in configuration having center opening 16 sized to the received armature shaft 60. About the exterior of washer 14 are located circumferentially-extending slots 42 which, together with washer 14 and remainder of brush card 6 serve to define tabs 40 which secure washer 14 to the remainder of brush card 6. Slots 42 at the radially-outward circumference define commutator opening 44. Commutator opening 44 is sized to allow commutator 11 to be inserted therein.

Washer 14 is shown in the mouting position wherein it serves to block the inward displacement of brush 9 in FIG. 2. Once shaft 60 is inserted through opening 16 during assembly, the armature is then in position for being displaced to separate the washer from the remainder of the brush card. Once the commutator engages the washer during assembly, the tabs break and the washer is displaced to the position shown in FIG. 1 between the commutator and bearing 4. Once the washer is displaced, there is no longer an exterior or shelf surface 17 of the washer which prevents the brush from being urged inwardly. Hence, as the washer is displaced, the spring urges the brush inwardly to engage the exterior surface of commutator 11 as is desired.

Figure 7:
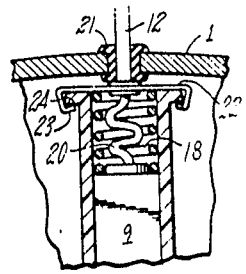
FIG. 7 is a sectional view of a means for connecting a conductor to a brush and for securing this assembly to the brush card.

Referring now to FIG. 7, the detail of one means for securing the brush relative to the housing is disclosed. Therein it may be seen that the cavity that holds the brush is formed in such a manner as to receive the brush assembly at the outer end of the cavity and after insertion, the brush is captured between one end of a spring and surface 17 of the washer (not shown). The other end of the spring rests against the cavity end closure means and is preferably a metal connector plate 22 to which brush shunt 20 and conductor lead 12 are secured. FIG. 7 specifically shows an arrangement where conductor 12 is inserted through grommet 21 secured within housing 1 of the motor. Conductor 12 is secured to plate 22 by solder or by mechanically crimping brush shunt 20 that extends up through brush spring 18 to connector plate 22. Shunt 20 forms an electrical connection between conductor 12 and brush 9. Plate 22 provides convenient means to make electrical connection between the outside conductor and a brush shunt. Further the plate provides a stop means for the brush spring which will be in the compressed state as it urges the brush towards the center of the brush card. As may be seen in FIG. 7, a connector plate tab 23 is provided for engaging lip 24 of the brush box defined by the card member such that the connector plate may be secured thereto. This is but one arrangement of securing a brush and making electrical connection thereto. Other similar arrangements are well known.

FIG. 2 again shows the brush holder assembly prior to assembly into the motor. During assembly operation, armature shaft 60 is inserted into opening 16 of the brush card. The diameter of the opening is preferably such that a slip fit exists between the shaft and opening 60 of the washer. As the shaft slips through the opening, the radially-extending face of the commutator comes into contact with the washer, and, as the pressure is applied by the motor assembly equipment, the washer breaks away from the brush card and travels with the commutator as the assembly operation of the motor continues. The washer now rests against the face of the commutator and may serve as a thrust surface for the armature during axial loading and may serve to control end play or axial movement of the armature within the motor housing. Another important function of the washer is to sling oil that characteristically seeps from oil impregnated bearing 4 or from other external sources to prevent that oil from creeping down the armature shaft and contaminating the brushes. Heretofore, often a separate washer was of necessity pressed onto the shaft to sling the oil off the shaft before it reached the brushes. It has been found that oil causes the brushes to gum up and stick in the brush boxes or causes other electrical problems between the brushes and the commutator which cannot be tolerated if effective motor operation is required.

FIG. 3 shows an alternative embodiment wherein brush card 25 is substituted for brush card 6 of FIG. 1. The remaining elements of the basic motor are labeled the same and are identical to the elements in FIG. 1. Brush card 25 is formed with a plurality of breakaway sections 26 each having a step portion 27 that functions as a shelf upon which brushes 8 and 9 rest prior to assembly. In contrast to the embodiment as shown in FIG. 1 however, this brush card provides for the step section to be broken away by the commutator during assembly such that the breakaway section separates into several pieces as shown in FIG. 3. These broken-away pieces fall harmlessly into a space between the brush card and end cap 28 of the motor and do not interfere with operation of the motor.

Figure 5:
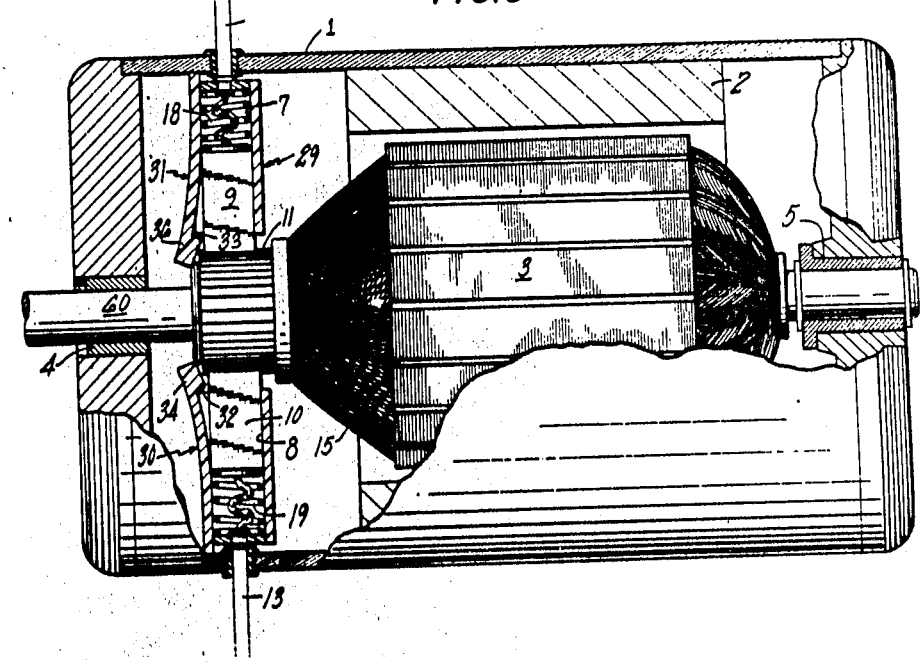
FIG. 5 is a sectional view of a dynamoelectric machine showing the position of various components therein including a brush card in accordance with another embodiment of the invention.
Figure 6:
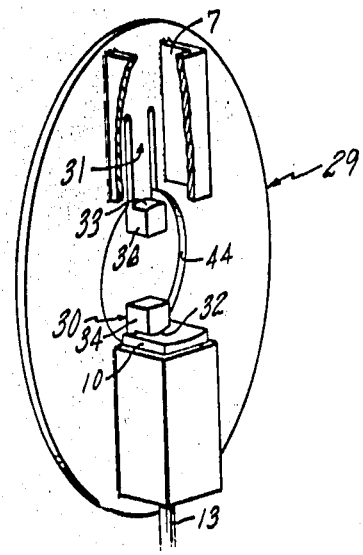
FIG. 6 is a perspective view of the brush card as shown in FIG. 5 prior to assembly into the motor.

Referring now to FIG. 5, there may be seen yet another embodiment of the herein invention. As in FIG. 3 the housing and motor parts of FIG. 5 are the same as those shown in FIG. 1. Brush card 29 in FIG. 5 includes a pair of projecting fingers 30 and 31, each of which has a projection 34 and 36 which extends inwardly and includes a contact surface 32 and 33 to engage respective brushes 9 and 10 to secure them in a mounting position. Projections 36 and 34 extend inwardly and at contact surfaces 32 and 33 engage the brushes such that the springs may not urge the brushes inwardly.

Upon assembly of the motor armature the radially-extending face of the commutator engages the projections and displaces them to the left as shown in FIG. 5. As the projections are displaced to the left, the fingers are bent and the retention of the brushes in the mounting position is released. The brush springs then urge the brushes inwardly to engage the commutator surface in the desired final configuration as shown in FIG. 5. Depending upon the strength and size of the fingers they may act to absorb some axial load exerted by the face of the commutator against the fingers when the motor is operated.

The invention has been described with reference to several specific embodiments. It is to be understood by anyone skilled in the art that variations and modifications can be effected within the spirit and scope of the invention.

I claim:

1. A method of assembling a dynamoelectric machine of the type having a housing and brushes that engage a commutator located on an armature having an armature shaft which comprises the steps of:
    securing a brush holder to the housing, said brush holder having at least one brush mounted for reciprocating movement, said brush holder including a brush spring for urging the brush in a first direction and an integral displaceable section formed as a portion of the brush holder extending to engage the brush to prevent further movement in the first direction;
    inserting the armature and armature shaft into the housing;
    displacing the armature against the displaceable section of the brush holder to the final assembled position of the armature, said armature separating the displaceable section from the remainder of the brush holder thereby allowing the brush spring to urge the brush inwardly against the commutator of the armature.

2. The method as set forth in claim 1 wherein the displaceable section defines a center opening sized to receive the armature shaft and wherein the step of displacing separates the displaceable section from the brush holder and positions the displaceable section to act as a thrust washer for the armature.

3. The method as set forth in claim 1 wherein the displaceable section defines at least one breakaway section and wherein the step of displacing causes the breakaway section to be separated from the brush holder and to drop within the housing.

4. The method as set forth in claim 1 wherein the displaceable section defines a finger including a projection for securing the brush in position and wherein the step of displacing further comprises engaging and displacing the finger to allow the brush to be urged against the commutator by the brush spring.

* * * * *